US008001157A

United States Statutory Invention Registration [19]

Design [11] Reg. Number: H1157

Yanou et al. [43] Published: Apr. 6, 1993

[54] FILTER

[76] Inventors: Manabu Yanou; Osami Kato, both c/o Mitsubishi Rayon Co., Ltd., 1-60 Sunadabashi 4-chome, Higashi-ku, Nagoya-shi Aichi; Kazuo Kuwahara, c/o Mitsubishi Rayon Co., Ltd., 3-19, Kyobashi 2-chome, Chuo-hu Tokyo 104, all of Japan

[21] Appl. No.: 454,131

[22] Filed: Dec. 21, 1989

[52] U.S. Cl. ..... D23/209

[58] Field of Search ..... D23/200, 207–210; 210/136, 198.1, 205–206, 231, 241, 244, 245, 257.1–257.2, 258, 260–261, 269, 275, 282, 288–290, 295, 321.6, 321.78, 413, 443–449

[56] References Cited

U.S. PATENT DOCUMENTS

| | | | |
|---|---|---|---|
| D. 216,691 | 3/1970 | Bates et al. | D23/207 |
| D. 220,958 | 6/1971 | Marsh | D23/207 |
| D. 238,363 | 1/1976 | Polens | D23/207 |
| D. 265,227 | 6/1982 | Jolley | D23/207 |
| 4,320,004 | 3/1982 | Schecter | 210/275 X |

FOREIGN PATENT DOCUMENTS

| | | |
|---|---|---|
| 703439 | 4/1987 | Japan . |
| 6342053 | of 1988 | Japan . |
| 6342054 | of 1988 | Japan . |

OTHER PUBLICATIONS

*Mechantronics Design News,* vol. 8, no. 2, 1983, p. 15.

*Primary Examiner*—Bernarr E. Gergory

[57] CLAIM

The ornamental design for a filter, as shown and described.

DESCRIPTION

Figure 1:
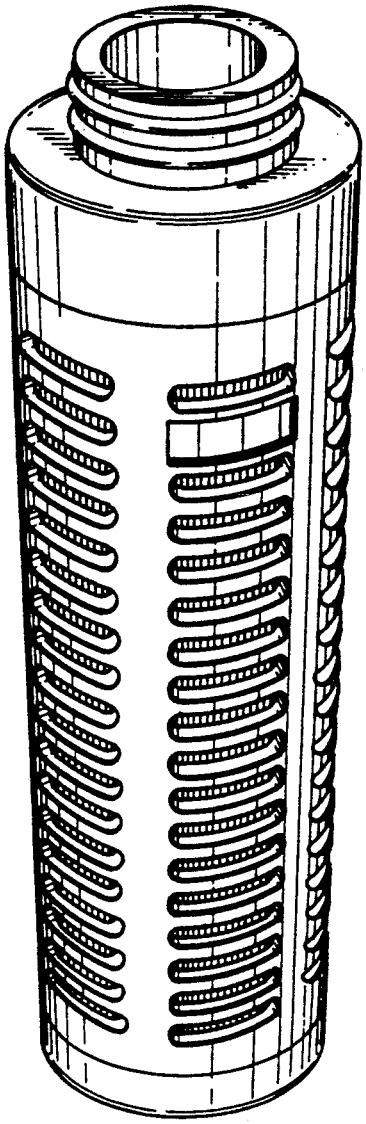
Figure 2:
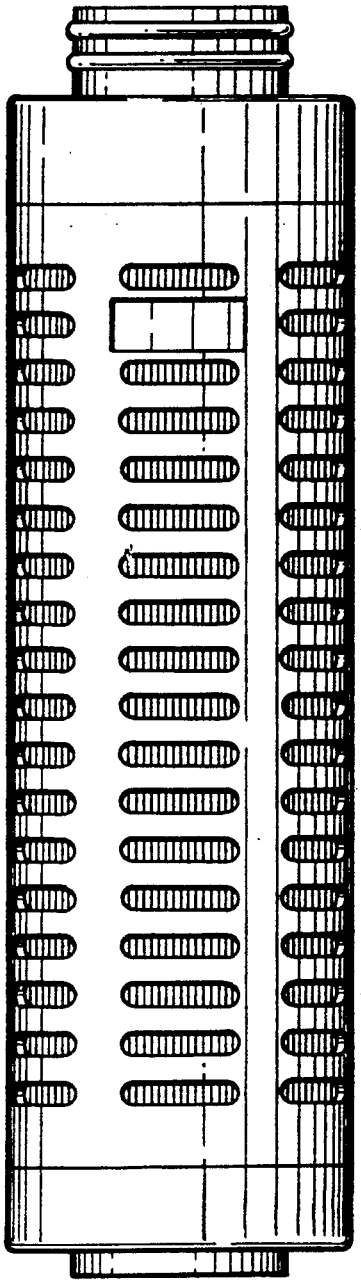
Figure 3:
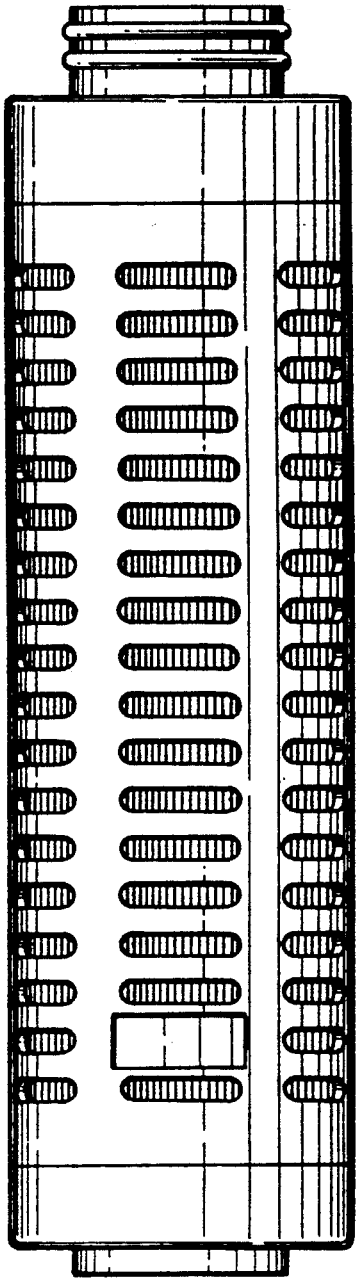
Figure 4:
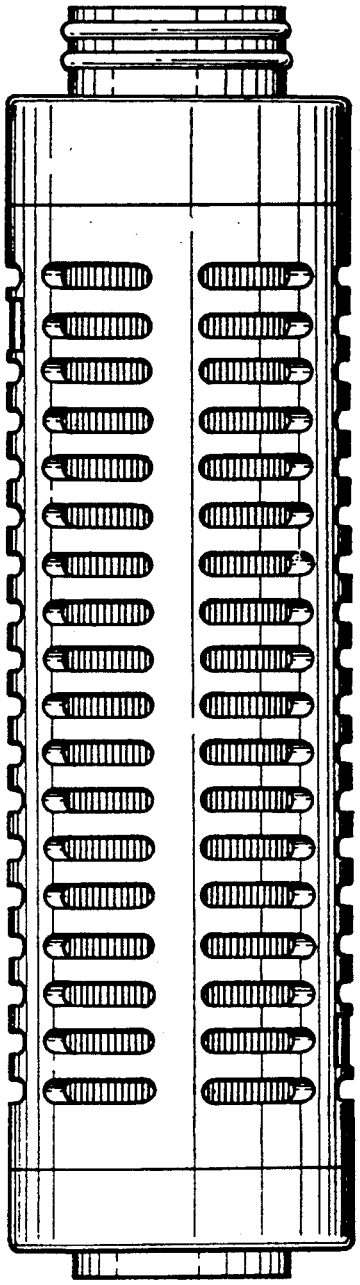
Figure 5:
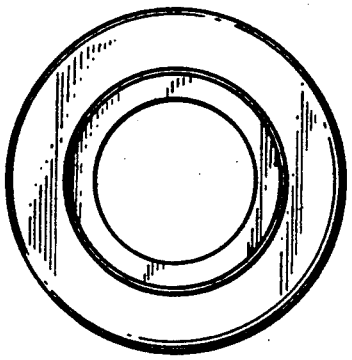
Figure 6:
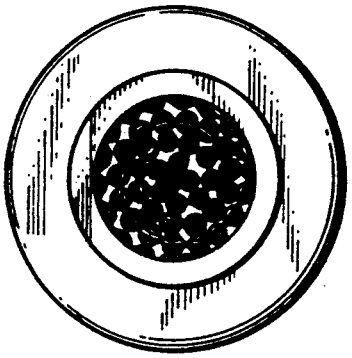
Figure 7:
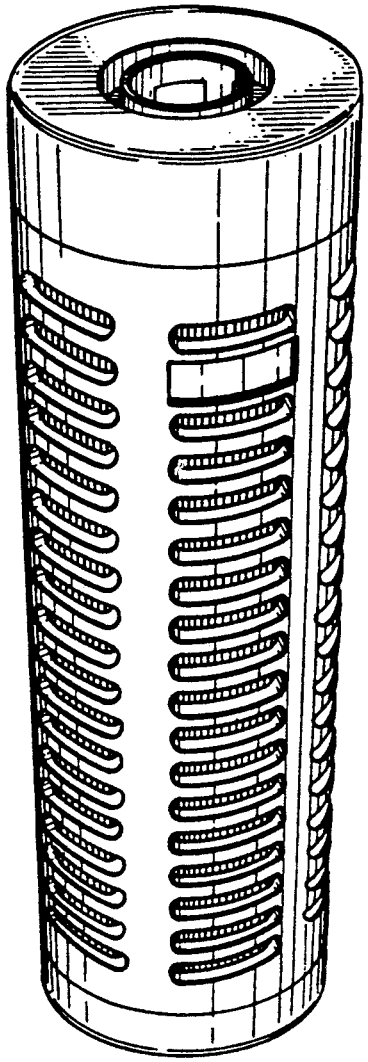
Figure 8:
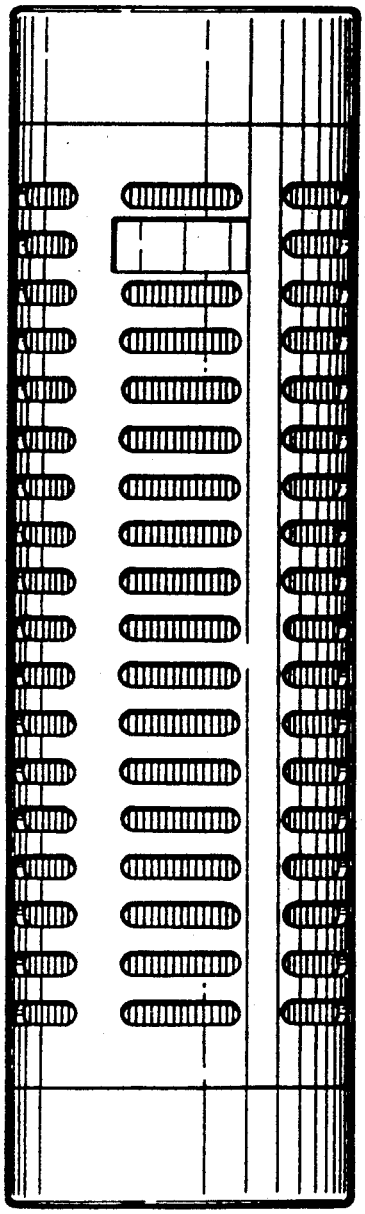
Figure 9:
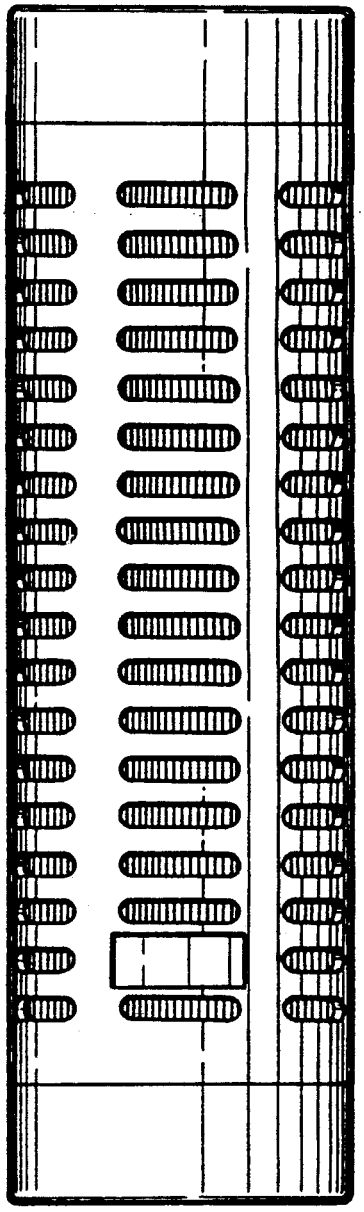
Figure 10:
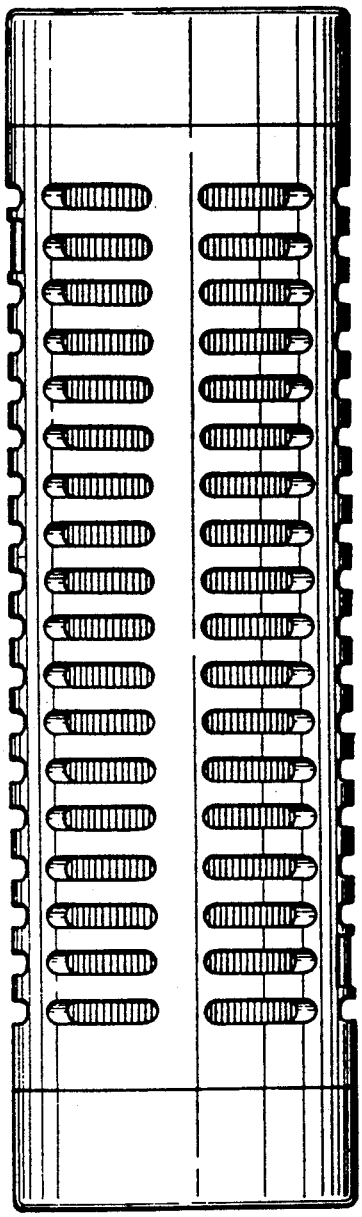
Figure 11:
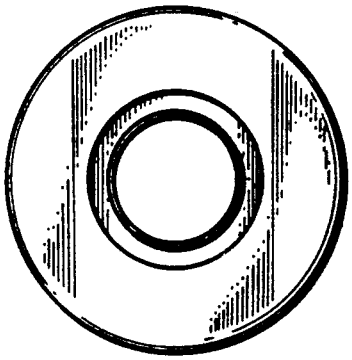

FIG. 1 is a top perspective view of a filter showing our new design;
FIG. 2 is a front elevational view thereof;
FIG. 3 is a rear elevational view thereof;
FIG. 4 is a right side elevational view thereof, the left side being a mirror image;
FIG. 5 is a top plan view thereof;
FIG. 6 is a bottom plan view thereof;
FIG. 7 is a top perspective view of a second embodiment thereof;
FIG. 8 is a front elevational view thereof;
FIG. 9 is a rear elevational view thereof;
FIG. 10 is a right side elevational view thereof, the left side being a mirror image; and
FIG. 11 is a top plan view thereof, the bottom plan view being identical.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.